June 17, 1930. C. S. CRICKMER ET AL Re. 17,700

MULTIPLE DISK DRILL BIT

Original Filed Oct. 21, 1925 2 Sheets-Sheet 1

Inventors
Charles S. Crickmer
Ivan C. Bell
By Jack Ashley
Attorney

June 17, 1930. C. S. CRICKMER ET AL Re. 17,700

MULTIPLE DISK DRILL BIT

Original Filed Oct. 21, 1925 2 Sheets-Sheet 2

Inventors

Charles S. Crickmer

Ivan C. Bell

By Jack Ashley

Attorney

Reissued June 17, 1930 Re. 17,700

UNITED STATES PATENT OFFICE

CHARLES S. CRICKMER AND IVAN C. BELL, OF DALLAS, TEXAS, ASSIGNORS TO THE GUIBERSON CORPORATION, OF DALLAS, TEXAS, A CORPORATION OF DELAWARE

MULTIPLE-DISK DRILL BIT

Original No. 1,657,610, dated January 31, 1928, Serial No. 64,019, filed October 21, 1925. Application for reissue filed October 23, 1929. Serial No. 401,915.

This invention relates to new and useful improvements in multiple disk drill bits.

An object of the invention is to provide a drill in which some of the disks are located at a lower elevation than the others, thereby cutting in advance of the others and making for more effective and more rapid drilling as well as providing for an adequate supply of slush liquid at the cutting points of the disks.

Another object of the invention is to provide a multiple disk drill bit equipped with advance disks and have a central tongue extending down between the disks and provided with fluid passages and discharge ports at its lower end, whereby slush liquid may be delivered substantially at the bottom of the hole and below the upper cutter disks and the disks thus more effectively cleaned.

Another object of the invention is to provide a disk bit having advance cutting disks mounted to wobble or oscillate and elevated cutting disks likewise mounted, whereby the hole will be drilled in two stages and the disks will undergo sufficient shearing movement to clean the bottom of the hole thus preventing retardation and dragging.

A still further object of the invention is to mount the disks in such offset relation that each will travel in a substantially individual orbit with a certain amount of drag, but owing to their oscillating action, will shear approximately the entire bottom of the hole.

A construction designed to carry out the invention will be hereinafter described together with other features of the invention.

The invention will be more readily understood from a reading of the following specification and by reference to the accompanying drawing, in which an example of the invention is shown, and wherein.

Figure 1:
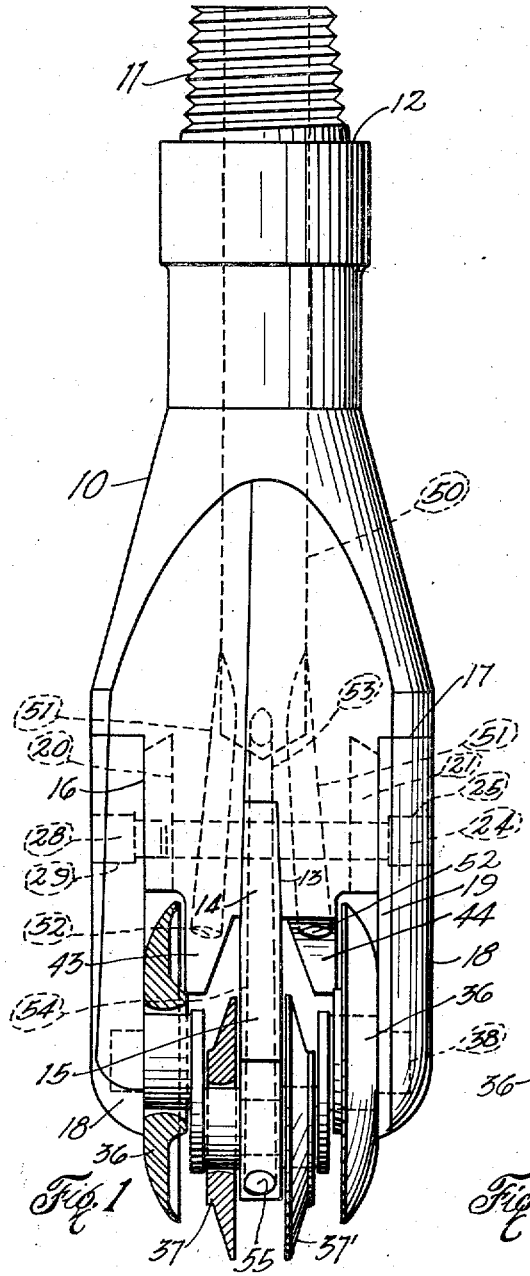
Fig. 1 is an elevation of a bit constructed in accordance with our invention.

In the drawings the numeral 10 designates a bit body or stock having a reduced tapered pin 11 or any other drill stem connection at its upper end. The pin is surrounded by an outwardly directed shoulder 12. The upper portion of the stock is conical although this is merely a preferred design. The stock has its front and rear sides converging downwardly and is formed with a transverse vertical and diametrical socket 13, extending at substantially right angles to said sides. The socket has its side walls converging upwardly to produce a wedge shape.

The upper wedge shaped end 14 of a flat tongue 15 is driven into the socket 13. On each side of the stock are provided flat vertical seats 16 having overhanging shoulders 17. Complementary cheek plates or hangers 18 are formed with flat inner faces 19 for contact with the seats 16. The outer sides or surfaces of the plates are curved to conform to the contour of the stock. The seats 16 have vertical key-ways 20, which may be dovetailed or otherwise formed. The plates have vertical keys 21 on their faces 19 shaped to fit in key-ways.

Figure 2:
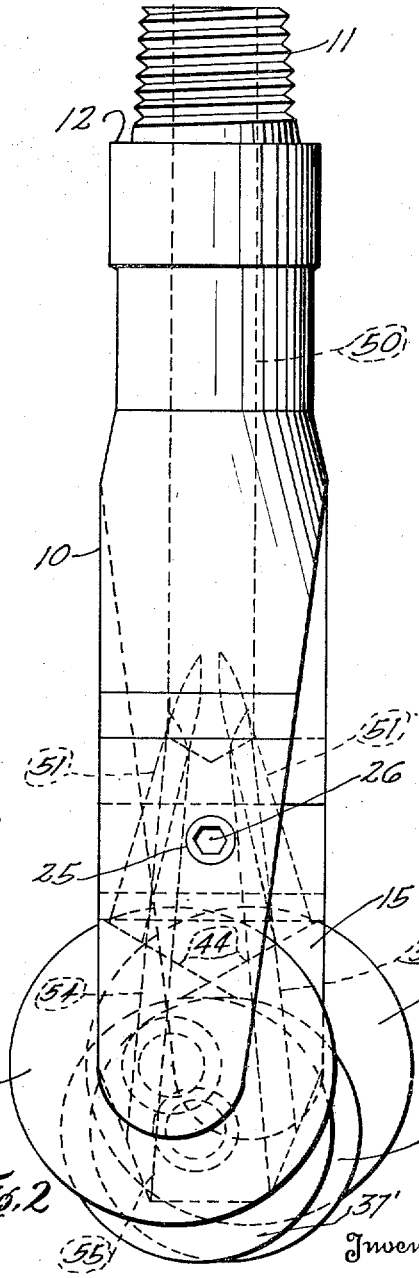
Fig. 2 is a side elevation of the same.

When the key is slid into the key-way from the bottom the shoulder 17 rests upon the top of the plate and said key, thus taking the upward thrust sustained by said plate. The plates have their faces 19 substantially parallel to the sides of the tongue 15 and spaced therefrom. By observing Figs. 2, 3 and 4, it will be seen that the front and rear sides of the stock and the edges of the plates are cut at such angles that the lower bearing ends of the plates are in offset relation with respect to a transverse axis passing centrally through the tongue. However, the keys and key-ways are located centrally of the stock and a single locking pin 23 holds the plates against downward displacement; the keys themselves preventing horizontal displacement.

Figure 3:
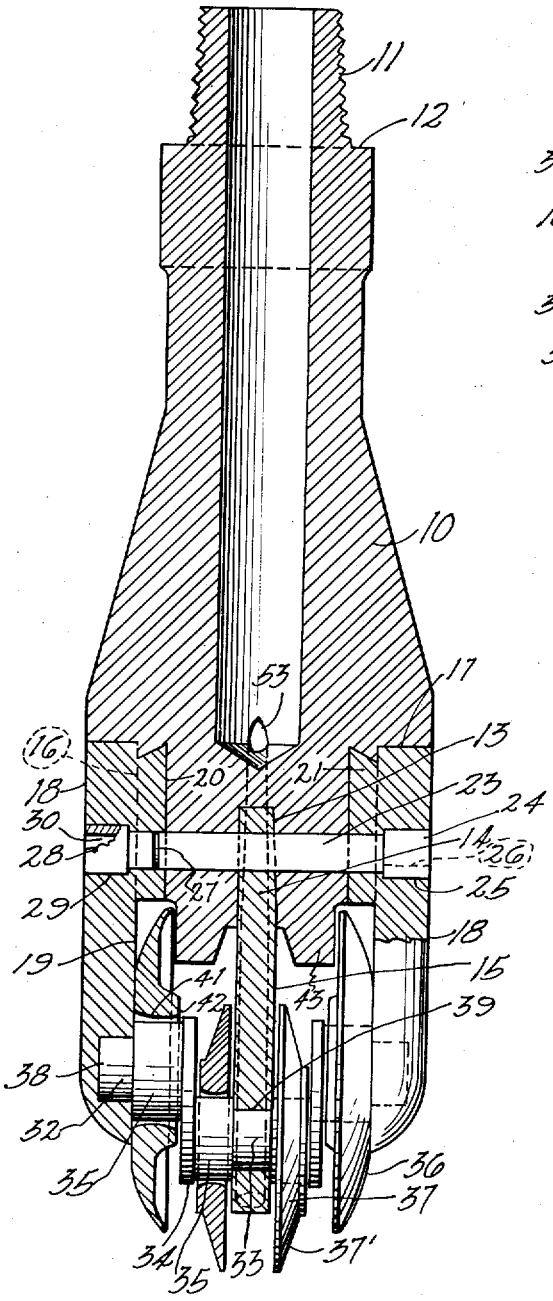
Fig. 3 is a vertical sectional view of the bit, two of the disks being in elevation.
Figure 4:
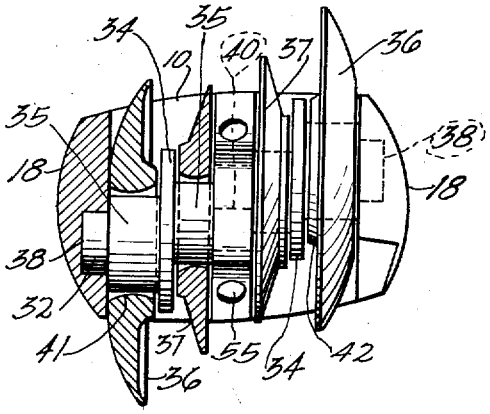
Fig. 4 is an underside view of Fig. 3.

The manner of fastening the pin 23 is shown in Fig. 3. At one end the pin has a head 24 countersunk in a counter bore 25 in one of the plates 18 (Fig. 3). This head has a wrench socket 26 (Fig. 2) therein. The other end of the pin is reduced and formed with an inclined annular shoulder 27 (Fig. 3). A shouldered nut 28 is countersunk in a counter bore 29 in the other cheek plate. This has a wrench socket 30 and screws on the end of the pin. The inner end of the nut rides upon the inclined shoulder 27 and binds the nut. By removing the nut and withdrawing the pin 23 the cheek plates may be removed. The means of attaching the plates is very satisfactory and tests of the bit in a hole show that the pin does not loosen nor do the plates spread; however any suitable means of fastening the plates may be used.

The plates and tongue support axles which comprise outer trunnions 32, inner trunnions 33. an intermediate circular disk or plate 34 and cylindrical bearing bosses 35 on each side of the disk and from which the contiguous trunnion extends concentrically. As the axles are duplicates, a description of one will explain both. The axle is constructed to provide vertical offset bearings for supporting circular cutting disks 36 and 37, respectively at different elevations, whereby one of said disks will cut in advance of the other as the hole is drilled.

The bosses are diametrically opposite, but when the axle is in position in the bit said bosses are offset on opposite sides of the vertical axis of the plate 34. This arrangement has the effect of locating one disk in advance of the other with regard to the rotation of the bit. It will be noted that the lower disk 37 is smaller in diameter than the upper disk 36 and is set adjacent to the tongue so as to drill the central portion of the hole; while the upper disk is larger in diameter and is set adjacent the hanger 18 to cut the outer portion of the hole.

While the lower disk is smaller in diameter the circumferential offset is sufficient to locate the active cutting edge of said disk in advance of the active cutting edge of the upper larger disk. This is a feature which has proved of considerable advantage because it gives to both disks a full rolling effect and offsets the shearing drag which would be present if the axles of the bearing bosses were vertically alined. However there may be instances where the circumferential offset would not be desirable and the invention is not to be limited to the same.

Figure 5:
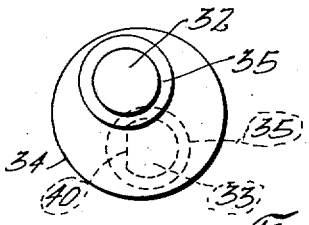
Fig. 5 is an elevation of the outer end of one of the axles.
Figure 6:
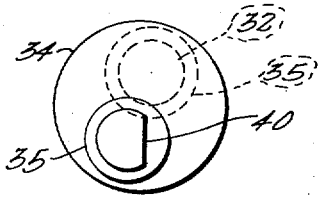
Fig. 6 is an elevation of the inner end of one of the axles.

The hanger 18 has a circular socket 38 on its inner face for receiving the trunnion 32 at the outer end of the axle. The inner trunnion 33 fits in an aperture 39 (Fig. 3) in the lower end of the tongue 15. It will be noted from Figs. 2 and 4 that the hangers 18 are offset on opposite sides of the transverse axis of the bit stock and in assembling the two axles the inner trunnions are placed side by side in the aperture 39. In order to hold the axles in position while the bit is being assembled the contacting portions of the inner trunnions are flattened at 40 (Figs. 5 and 6) so that when inserted in the aperture said axles are held against revolution.

This mounting of the axles disposes them on opposite sides of the transverse axis of the bit stock and the circumferential offset relation of the disks is carried out between disks of each axle as well as between the disks themselves. One of the difficulties with drill disks is the tendency not to track or revolve, thus wearing flat instead of wearing to a cutting edge and retaining roundness. The present arrangement overcomes these troubles.

A very important feature of the invention in combination with the advance location of the disks 37, is the mounting of the disks, whereby they are free to oscillate or rock on their bearings, thus wobbling as they revolve. In Letters Patent Nos. 1,657,607 and 1,657,608, issued January 31, 1928 are shown two forms of bearings for mounting this type of disks, both giving the same result and while we have employed in the drawings of the present application, the form shown in the first patent, the form shown in the second patent may be used. Each disk has a curvilinear or flared bore 41 in its hub 42, which bore is struck on a continuous transverse curve or convex arc. It is pointed out that each boss 35 has a bearing face or periphery of greater width than the hub of the disk mounted thereon, thus providing for lateral play of each disk as well as affording each disk full opportunity to rock laterally on its bearing, due to the convex curvature of its bore. It is obvious that the curved bore of the disk will cause it to oscillate or wobble as it revolves, because it also has some side or lateral play. If the bore of the disk is larger than the axle so as to provide a clearance therebetween, then the disk may have some vertical movement and this will amplify the oscillation or wobble.

The dominating feature as stated is the advance cutting location of the disks 37 and this provides for the extension of the tongue 15 to a somewhat lower elevation than the ends of the cheek plates 18. Thus the advance disks 37 will cut at a lower elevation than the upper disks 36. This arrangement makes for faster and easier drilling and has the effect of "rat-tailing" the hole, as it is commonly known in the field. It is apparent that when the drill is rotated the disks will travel in comparatively wide orbits owing to their ability to oscillate or wobble and will thus shear off as well as cut into the formations at the bottom of the hole. Also the drilling or cutting will be carried out at two stages or elevations. In this connection the relative mounting of the two axles is clearly shown in Fig. 4. By placing the axis of the axles on opposite sides of the transverse axis of the bit, the disks are properly relatively offset or stepped circumferentially of the bit.

The particular shape of the disks is not essential to the invention, but we secured good results by forming the disks 36 with their outer faces convex and their inner faces dished or concaved. The lower ends of the plates 18 may also be rounded off. This arrangement tends to reduce resistance to the downward travel of the bit and the concavo-convex shape of the disks 36 reduce the thickness of the cutting edges of the disks, whereby they more readily wear to a sharp cutting edge. The lower disks 37 are provided with flat inner faces so as to revolve in close proximity to the sides of the tongue 15 and each has a bevel 37′, inclining away from the center of the bit which enhances its wearing qualities and facilitates its drilling function and its downward travel.

The forked or bifurcated lower portion of the drill stock, produced by the formation of the socket 13 (Fig. 3), is provided with fingers or projections 43 which extend downwardly between the inner faces of the disks 36 and the tongue 15, but which terminate above the disks 37. These fingers are substantially triangular in form and have their lower edges 44 inclined in opposite directions, respectively toward the front and rear sides of the bit. The function of these fingers is to wipe or remove from the edges of the disks 36 drillings or viscous matter adhering thereto. The reverse inclination of bottom edges of the fingers causes deposits which are removed from the disks to be discharged on opposite sides of the transverse axis of the bit, thus further decreasing the tendency to clog.

The application of a slush liquid to the disk and its discharge at the bottom of the hole, due to the low elevation of the bottom of the tongue is an important feature of the invention.

A well 50 is bored axially in the pin 11 and stock 10 to a point just above the socket 13. Ducts or courses 51 diverge from the lower portion of the well on each side of said socket. These ducts are provided with flaring mouth portions 52 which extend downwardly through the respective fingers 43 and open at their delivery ends through the inclined edges 44 thereof. Water or other cooling and cleansing fluid may be discharged through these courses against the surfaces of the disk to wash away the cuttings and keep the disks and axles cool. By extending these ducts or courses downward through the fingers 43, the streams discharging therefrom will be directed throughout a wide area against the faces of the disks, and, the water being concentrated in the channels formed between the faces of the disks and the inclined edges 44 of the fingers, will be caused to exert a forcible washing action, thus cooling the disks the full distance radially between their hubs and cutting edges and ensuring the thorough washing out of all cuttings or grindings lodging between the disks and upon the cutting edges thereof. A duct 53 is also formed in the stock and communicates with diverging ducts 54 extending down through the tongue 15 and having flaring outlets 55 arranged to discharge the cooling and cleansing fluid centrally of the cutters and between the inner rotary cutting disks in the cutting region of the bit. The water discharged from this duct will accordingly flow over the disks at points adjacent to the advance edges thereof and directly to the points of contact with the substance being bored or drilled, thus further increasing the efficiency of the cleansing and cooling actions.

The character of disk mounting which has been pointed out has numerous advantages, such as that of self-sharpening; ready rolling or revolution, which means proper traction; rapid cutting in shale and rock formations as well as in soft and viscous formations; and self-cleaning. These disks do not need lubrication as the fluid pumped through the drill stem will keep them clean, cool and free from excessive wear on the axles. The disks used are of comparatively small diameters when contrasted with the disks used on drills of this class. It will be observed that the cutting disks are arranged in pairs, one pair on each side of the vertical center of the drill bit, the adjacent faces of the disks of each pair being spaced apart to a fairly wide degree so that a gang of four disks will have a wide cutting area. As a result of this wide cutting area and the efficiency of cutting action of the disks, a type of drill is provided which has a cutting action approximately equal to that of drills of ordinary construction in which a gang of six cutting disks is employed, three on each side of the vertical center of the drill, and at the same time a more compact form of drill is produced.

Various changes in the size and shape of the different parts, as well as modifications and alterations may be made within the scope of the appended claims.

What we claim, is:

1. In a multiple separate cutter disk bit, a bit stock, cutter disks revolubly and independently mounted upon the stock, adjacent disks being spaced apart at their hubs, and projections on the stock extending relatively into the spaces between the disks, two of said disks being mounted at the center of the bit below the other disks.

2. In a multiple cutter disk bit, a bit stock, separate disks revolubly and independently mounted upon the stock, and downwardly directed fingers on the stock extending relatively between adjacent faces of adjacent disks, two of said disks being mounted at the center of the bit below the other disks.

3. In a multiple cutter disk bit, a bit stock, hangers depending from the stock, the lower ends of the hangers being rounded, revoluble disks mounted adjacent the hangers and having their outer sides convex, clearance fingers depending adjacent the inner sides of said disks, and advance cutting disks spaced from and mounted below the fingers and the other disks at the center of the bit.

4. In a multiple cutter disk bit, a bit stock, hangers, depending from the stock, the lower ends of the hangers being rounded, revoluble disks mounted adjacent the hangers and having their outer sides convex, clearance fingers depending adjacent the inner sides of said disks, and advance cutting disks mounted below the fingers and the other disks at the center of the bit, said fingers having liquid outlets discharging over said advance cutting disks and against the inner sides of the first named disks.

5. In a multiple cutter disk bit, a bit stock, hangers depending from the stock, the lower ends of the hangers being rounded, revoluble disks mounted adjacent the hangers and having their outer sides convex, clearance fingers depending adjacent the inner sides of said disks, and advance cutting disks mounted below the fingers and the other disks at the center of the bit, said fingers having liquid outlets discharging over said advance cutting disks and against the inner sides of the first named disks, and means for delivering a slush liquid between the lower edges of the advance cutting disks.

6. In a multiple cutter disk bit, a bit stock, upper cutting disks mounted on the lower end of the bit stock, advance cutting disks mounted at the center of the bit below the upper disks, said disks being initially loosely mounted with sufficient play at their journals to wobble as they revolve.

7. In a multiple cutter disk bit, a bit stock, upper cutting disks mounted on the lower end of the bit stock, advance cutting disks mounted at the center of the bit below the upper disks, said disks being initially journaled to wobble as they revolve, and means for supplying a slush liquid to the disks.

8. In a multiple cutter disk bit, a bit stock, hangers at the sides of the stock, a central tongue depending from the stock, axles supported between the hangers and the tongue having vertically offset axes, and cutting disks mounted on said journals, the disks being initially mounted free to wobble on their journals.

9. In a multiple cutter disk bit, a bit stock, hangers at the sides of the stock, a central tongue depending from the stock, axles supported between the hangers and the tongue having vertically offset axes, and cutting disks mounted on said journals, the disks being initially mounted to wobble on their journals, the tongue having liquid ducts provided with outlets below the journals of the lowermost disks.

10. In a multiple cutter disk bit, a bit stock, supports at the lower end of the stock, axle members carried by the supports, each axle member having a plurality of bearing collars spaced vertically and transversely from each other, and disks mounted on said axle collars and having flared hub bores loosely surrounding said collars, whereby said disks rock as they revolve.

11. In a multiple cutter disk bit, a bit stock, hangers at the sides of the stock, a central support depending from the stock, upper disks journaled contiguous to the inner sides of the hangers, lower disks journaled contiguous to the central support and at a lower elevation than the upper disks, said disks being loosely mounted and having sufficient clearance at their journal to wobble when revolved.

12. In a multiple cutter disk bit, a bit stock, hangers at the sides of the stock, a central support depending from the stock, upper disks journaled contiguous to the inner sides of the hangers, lower disks journaled contiguous to the central support and at a lower elevation than the upper disks, said disks being loosely mounted and having sufficient clearance at their journal to wobble when revolved, the central support having liquid supply ducts provided with outlets located between the lower disks.

13. In a multiple disk drill bit, a stock, hangers detachably secured to the stock at opposite sides thereof, a tongue depending from the stock between the hangers, axles having their ends supported in the hangers and the tongue, each axle including a vertical plate having journals offset vertically on opposite sides thereof, and circular cutting disks loosely mounted on the journals of the axles, the bores of the disks being flared and the disks being free to rock on their journals.

14. In a multiple disk drill bit, a stock, hangers detachably secured to the stock at opposite sides thereof, a tongue depending from the stock between the hangers, axles having their ends supported in the hangers and the tongue, each axle including a vertical plate having journals offset vertically on opposite sides thereof, circular cutting disks loosely mounted on the journals of the axles, the bores of the disks being curvilinear and the disks being free to rock on their journals, and wipers contiguous to the upper disks.

15. In a multiple disk drill bit, a stock, hangers detachably secured to the stock at opposite sides thereof, a tongue depending from the stock between the hangers, axles having their ends supported in the hangers and the tongue, each axle including a vertical plate having journals offset vertically on opposite sides thereof, circular cutting disks loosely mounted on the journals of the axles, the bores of the disks being flared and the disks being free to rock on their journals, and wipers contiguous to the upper disks, the tongue having liquid supply ducts provided with outlets at their lower ends, the bit and wipers having liquid supply ducts provided with outlets at their lower ends.

16. In a multiple cutter disk bit, a bit stock, supports at the lower end of the stock, a plurality of cutter disks carried by the supports and having flared journal bearings, whereby said disks may wobble as they revolve, the central disks extending below the outer disks.

17. As a sub-combination in a disk bit, a central depending support, axles extending from opposite sides of said support and on opposite sides of the transverse axis thereof, each axle including a spacing member and journals one above the other offset on opposite sides of said member, disks mounted on said journals of the axles, and supports for the outer ends of said axles.

18. In a multiple cutter disk bit, a bit stock, depending supports at the bottom of the stock, axles carried by said supports and disposed on opposite sides of the diametrical axis of the stock, each axle including cylindrical bearings eccentric to each other one above the other, rotatable disks mounted on said eccentric bearings of the axle, and means between the eccentric bearings of each axle for maintaining said disks in spaced relation and preventing contact of their cutting edges.

19. In a multiple disk drill bit, a stock, hangers depending from the stock at opposite sides thereof, a tongue depending from the stock between the hangers, axles having their ends supported in the hangers and the tongue and located on opposite sides of said tongue, and also on opposite sides of the transverse axis of the stock, each axle including bearings eccentric to each other and disposed one above the other on the same side of the transverse axis of the stock, cutter disks mounted on the bearings of said axle, and means for spacing the disks of each axle apart and preventing contact therebetween.

20. The combination set forth in claim 19 with liquid ducts discharging between the outer cutter disks and the central cutter disks, and other ducts discharging from the bottom of the tongue between the central cutter disks.

21. The combination set forth in claim 19 with liquid ducts discharging from the bottom of the tongue between the central cutters.

22. In a multiple disk drill bit, a stock, hangers depending from the bottom of the stock at opposite sides and spaced apart, a central depending support between the hangers and spaced therefrom, axles supported between the hangers and the support and located in offset relation on opposite sides of the transverse axis of the stock, each axle including a pair of bearing portions in eccentric relation to each other and disposed one above the other on the same side of the transverse axis of the stock, cutter disks mounted on the bearing portions of the axles, whereby their advance edges function in the drilling operation, the inner disks being contiguous to the central support and the outer disks being contiguous to the hangers, and means carried by the axles for spacing the disks apart and maintaining them out of contact with each other.

In testimony whereof we affix our signatures.

CHARLES S. CRICKMER.
IVAN C. BELL.